(12) United States Patent
Suzuki et al.

(10) Patent No.: US 6,930,967 B2
(45) Date of Patent: Aug. 16, 2005

(54) OPTICAL DISC RECORDING/REPRODUCING APPARATUS THAT RECORDS/REPRODUCES DATA AFTER FINALIZING PROCESS

(75) Inventors: Yoshiaki Suzuki, Hamamatsu (JP); Tamotsu Homma, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 302 days.

(21) Appl. No.: 10/369,390

(22) Filed: Feb. 19, 2003

(65) Prior Publication Data

US 2003/0218951 A1 Nov. 27, 2003

(30) Foreign Application Priority Data

Feb. 20, 2002 (JP) ...................................... 2002-043368

(51) Int. Cl.⁷ ............................................... G11B 5/58
(52) U.S. Cl. ............................... 369/53.41; 369/47.13; 369/59.1
(58) Field of Search ............................. 369/47.1, 47.13, 369/47.17, 47.22, 53.1, 53.2, 53.24, 53.31, 53.41, 59.1

(56) References Cited

U.S. PATENT DOCUMENTS 5,889,742 A * 3/1999 Kuroda .................... 369/59.26
6,742,147 B1 * 5/2004 Sasaki et al. .............. 369/53.1
6,775,211 B1 * 8/2004 Tsukihashi ............... 369/47.28

* cited by examiner

Primary Examiner—Muhammad Edun
(74) Attorney, Agent, or Firm—Pillsbury Winthrop Shaw Pittman LLP

(57) ABSTRACT

An optical disc recording/reproducing apparatus detects last position information of already recorded data and information of initial data recordable capacity of an optical disc that is in a state of no further writing by a recording completion process, a calculating device that calculates data recordable capacity of a free space in accordance with the last position information of already recorded data and the information of initial data recordable capacity of the optical disc and records data in the free space after the last position of already recorded data. The optical disc recording/reproducing apparatus scans the area after the last position of the already recorded data, and when the recorded data is found in the area, the data recorded after the last position is read. Data can be recorded to or reproduced from a free space of the optical disc to which the finalizing process has been executed.

17 Claims, 12 Drawing Sheets

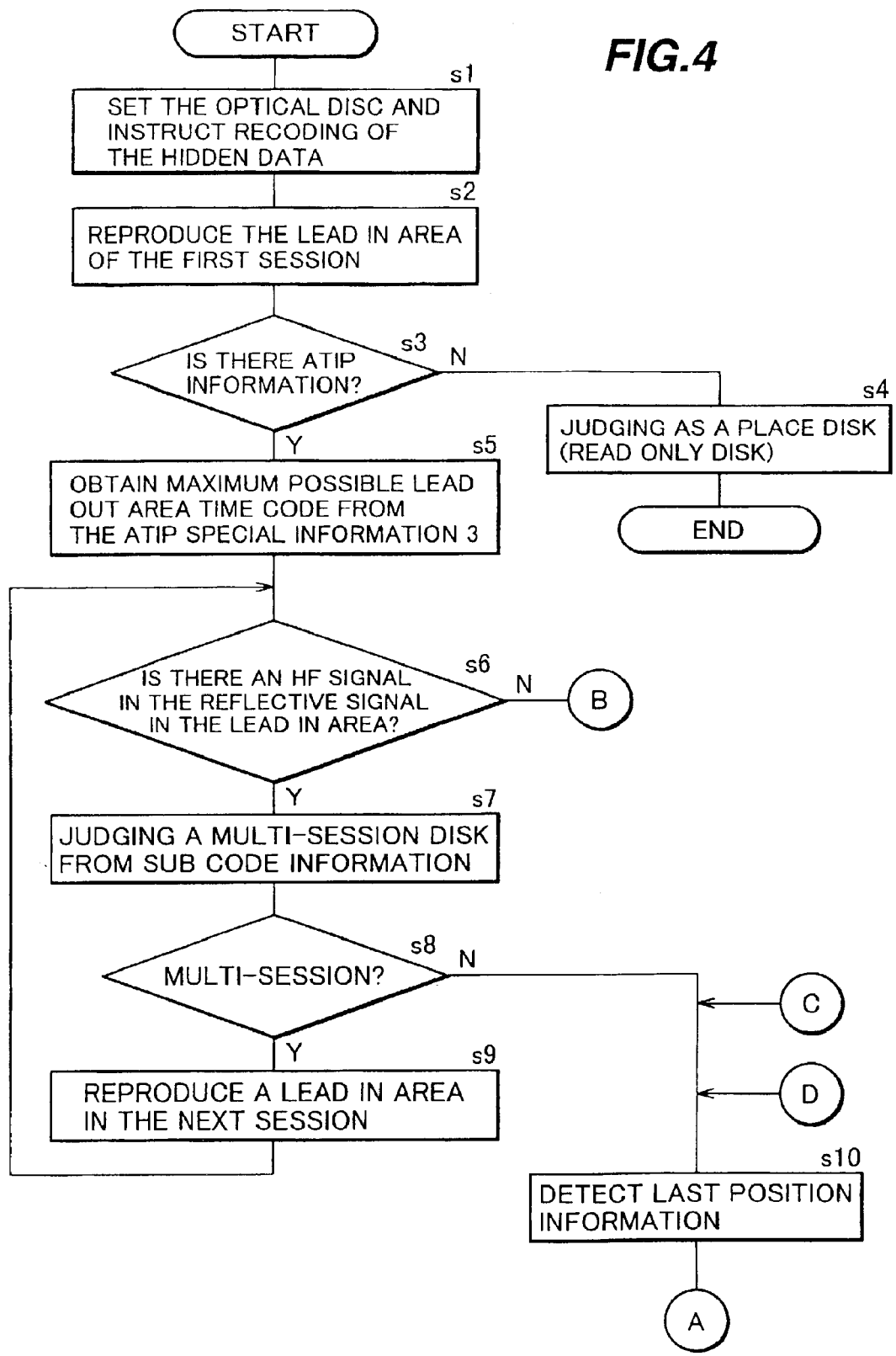

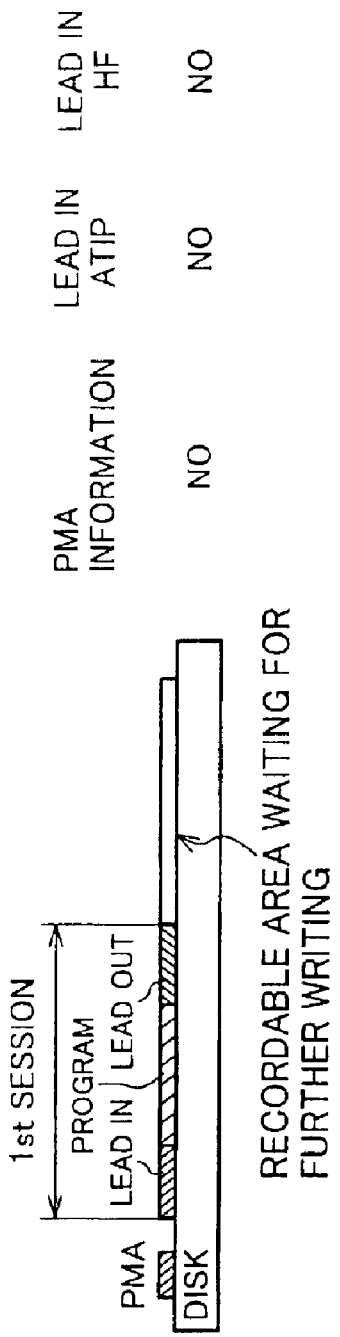
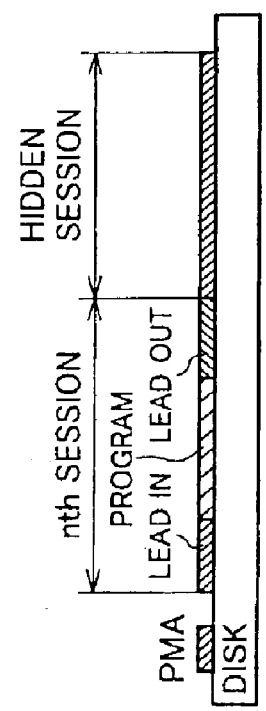
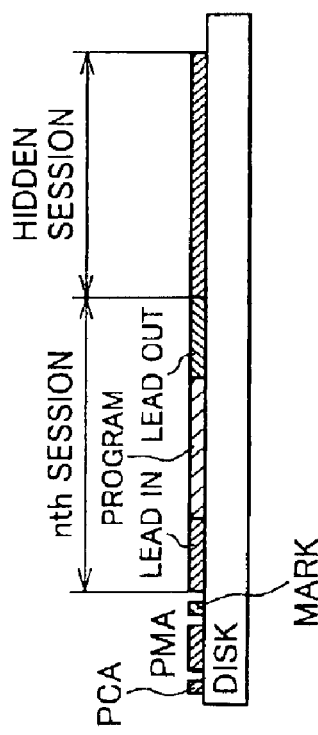
FIG.7E
FIG.7F
FIG.7G

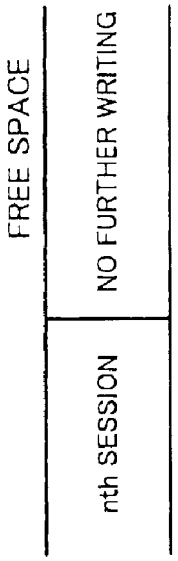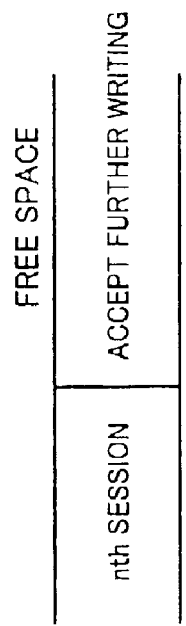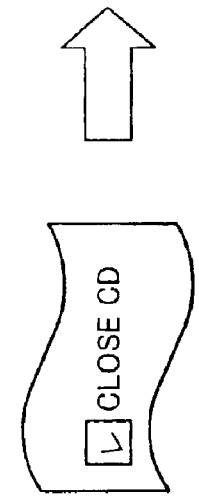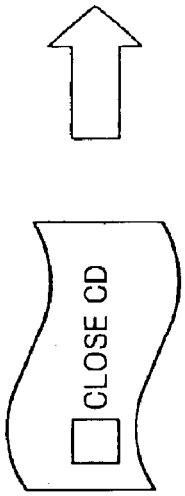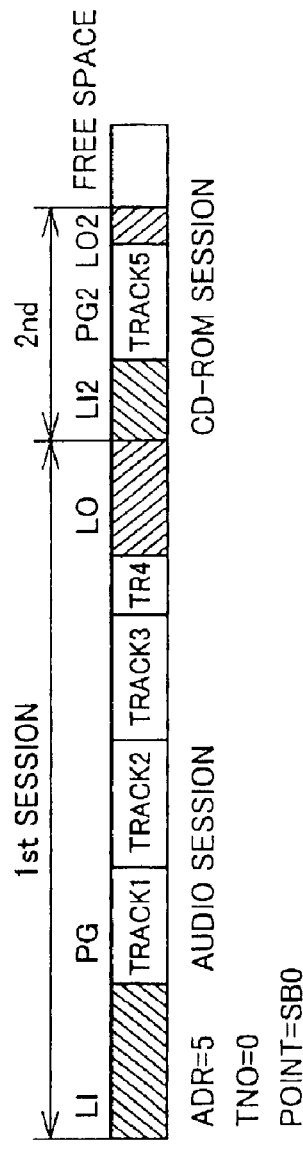
FIG.11A
FIG.11B
FIG.12

OPTICAL DISC RECORDING/REPRODUCING APPARATUS THAT RECORDS/REPRODUCES DATA AFTER FINALIZING PROCESS

CROSS REFERENCE TO RELATED APPLICATION

This application is based on Japanese Patent Application 2002-043368, filed on Feb. 20, 2002, the entire contents of which are incorporated herein by reference.

BACKGROUND OF THE INVENTION

A) Field of the Invention

This invention relates to recording of new data to an optical disc in a state of no further writing by a finalizing process and reproduction of the recorded data.

B) Description of the Related Art

In recent years, prices for a data-recordable optical disc, an optical disc recording/reproducing apparatus, software for data recording, a computer and the like are decreasing. Also, the optical disc is a medium to which a large capacity of data can be recorded. Therefore, the optical disc is widely used for recording/reproducing and backup various data such as audio (musical) data, data for computer, image data, motion picture data and the like. As a data recordable optical disc for recording, for example, there are a write-once optical disc to which data can be recorded only once such as a CD-R and a DVD-R and a re-writable optical disc to which data can be rewritten such as a CD-RW, a DVD-RW, a DVD+RW and a DVD-RAM. In these optical discs, currently the CD-R and the CD-RW are particularly popular.

In a case that information is recorded to the CD-R/RW, the recording is executed in accordance with a format provided by a CD-DA standard, a CD-ROM standard and a multi-session CD standard corresponding to data to record in order to maintain a compatibility. Also, in the case that data is recorded to the optical disc in accordance with the above standards, it is provided to record by a unit called a session that is a lead in area, a program area and a lead out area as one unit. The optical disc that recorded with formats of the CD-DA standard and the CD-ROM standard (single session) equips one session for one optical disc and is also called a single session CD. Also, the optical disc recorded with the format provided by the multi session CD standard equips a plurality of sessions for one optical disc. In this case, the standard provides to set one minute thirty seconds for the lead out area in a first session, and one minute for the lead in area and thirty minute for lead out area after a second session.

FIG. 10 is a diagram showing a data structure of the optical disc, and FIG. 10A is a diagram of a state of a CD-R without any recorded data (i.e., a blank disk). In a recording area, a starting point to write information and a maximum outer edge position of the lead out area are fixed. That is, a starting position of the program area is $\phi 50$ mm, and a starting position of a last possible lead out (LLO) time is $\phi 116$ mm. Also, when these starting position are presented in time information, the starting position of the program area is 00m:00s:00f, and the starting position of the LLO is 79m:59s:74f in the case of an optical disc with a capacity of 70 MB. The "m", the "s" and the "f" are abbreviations of minute, second and frame.

Also, the inside from the starting position of the program area is an area that is set as the lead in area, and identity information of the blank disk uses a cycle change of a wobble of a guiding groove to record as an absolute time in pregroove (ATIP). The cycle of the guiding groove is a FM modulation of the ATIP information, and LLO information can be acquired as a disk capacity from the ATIP information.

FIG. 10B is a diagram in the case that the finalizing process is executed by recording CD-DA standard (music CD) information. A table of contents (TOC) information is recorded in the lead in area, and in the case that a plurality of tracks are recorded in the program area, a starting time (position information) and a starting time of the lead out area of each track are recorded in the TOC as a contents information. Further, in this case, the standard provides to set one minute thirty seconds for the lead out area in order to record data as the first session.

FIG. 10C is a diagram in the case that the finalizing process is executed by recording CD-ROM standard (data for a computer) information. However, it is a similar session structure as FIG. 10B, the program area is only a track 1, and a starting time (index information) of the track 1 and the starting time of the lead out area are recorded in the TOC. Also, actual index information is recorded in a beginning part of the program area.

FIG. 10D is a diagram of the case of the multi session and shows the case that the finalizing process is executed in a third session. Since the finalizing process is not executed after recording the first session and the second session, further writing of the second session and the third session is possible. However, since the finalizing process is executed in the third session, data cannot be written further after that.

Writing method of data to the optical disc is roughly classified into two, a disk at once (hereinafter called DAO) and an incremental write. Also, there are three kinds of methods in the incremental write, and they are a track at once (hereinafter called TAO), a session at once (hereinafter called SAO) and a packet write.

The DAO is a method for writing the whole CD from the beginning at a time in a sequence of lead in, data and lead out. Further, in this method, when data is written once, further writing of data cannot be executed after that.

The TAO is a method for writing each track, and an actual writing is executed in a sequence of data, lead in and lead out. In this method, writing is executed one by one track, and after finishing writing of all tracks, a close session can be executed.

The SAO is a method for writing by a session. When this method is used, a plurality of sessions can be recorded in one optical disc, and a multi session CD can be made.

The packet write is a writing method only for computer that can execute further writing by a file.

In the case that data is recorded in a further writing type optical disc by the above described each method, data writing is executed with an optical disc reproducing apparatus by using a writing soft installed in a computer. FIG. 11 is a diagram showing the finalizing process by the writing soft. FIG. 11A is a diagram showing a process to make the optical disc no further writing. When an option "close the CD (make no further writing)" of the writing soft is checked, recording executed after that is finished to execute the close session, and a disk close is executed, and the further writing type optical disc becomes to be in a state of no further writing and cannot execute any writing after that. That is, the further writing type disk cannot revise the recorded data.

FIG. 11B is a diagram showing a process for enabling further writing to an optical disc. On the other hand, when an option "close the CD" of the writing soft is not checked, session can newly be written after that because the disk close is not executed; however the recording to be executed is terminated to execute close session.

A difference between these operations is according to a difference of the information of the lead in area at a time of recording data. That is, the TOC information is recorded as sub code information in the lead in area, and when an item in the multi session information is "ADR=5, TNO=0, POINT=$B0", the information shows that the disk is multi-session. Also, other item shows the starting time of the program area and the starting time of the leading out (LO). Further, when the disk is not multi-session, there is not "ADR=5, TNO=0, POINT=$B0" in the sub code information. Therefore, by distinguishing the above information, the optical disc reproducing apparatus can judge either there is more session the outer session or the session is the last session (the last session).

As the above, after a data is recorded with a setting to prevent further writing (recording further writing preventing information) by executing the finalizing process when the data is recorded by each method of the incremental writing, further writing will be impossible. Therefore, however it is effective in the point of preventing data revision, data cannot be added in the case that recorded data is less and a large vacant capacity is remained. Therefore, it is a problem that the free space of the optical disc is useless.

On the other hand, there is a CD extra (or also called CD+) standard as the multi-session CD standard. FIG. 12 is a diagram showing a data structure of the CD extra. The optical disc recorded in accordance with this standard has two session structure of the first session and the second session as shown in FIG. 12. That is, the first session is the CD-DA and records music, voice and the like. Also, the second session is the CD-ROM and records data such as data for computer, image, text and the like.

The CD extra with this recording format can executing further writing data for computer in the second session after recording the musical data recorded in the first session. However, in the case that data is recorded with the CD extra standard, when data is recorded in the second session to execute the finalizing process, it is the problem that data cannot be written further after that in this method, too.

Also, since the CD extra is a multi-session CD, in the sub code of thee lead in area of the first session, there is "ADR=5, TNO=0, POINT=$B0". However, a CD player manufactured in accordance with only the CD-DA standard can reproduce only the CD-DA and does not support the multi-session. Therefore, when "ADR=5, TNO=0, POINT=$B0" is presented in the sub code of the lead in area of the first session, the CD player ignores it (cannot recognize it). Therefore, the CD player reproduces only the first session, the CD-DA part, to finish, and does not reproduce the second session.

On the other hand, a CD-ROM device connected to a computer that supports multi-session and a player only for the CD extra can reproduce the first session and the second session of the CD extra.

Therefore, the second session of the CD extra is hidden data that cannot be read out for the CD player. However, since the second session of the CD extra can be reproduced easily by the CD-ROM device and the player only for the CD extra, it is not hidden data for these devices.

SUMMARY OF THE INVENTION

It is an object of the present invention to provide an optical disc recording method and an optical disc recording apparatus that can record new data in accordance with the data standard of the before-described optical disc in the free space of the optical disc in a state of no further writing by the finalizing process.

Also, it is another object of the present invention to provide an optical disc recording method and an optical disc recording apparatus of hidden data that can be reproduced by a specific optical disc reproducing apparatus in the free space of the optical disc in a state of no further writing by the finalizing process.

Further, it is another object of the present invention to provide an optical disc reproducing apparatus that can reproduce data recorded in an area after a last position of the previously recorded data of an optical disc that is in a state of no further writing with a finalizing process.

According to one aspect of the present invention, there is provided an optical disc recording method, comprising the steps of: (a) detecting last position information of already recorded data and information of initial data recordable capacity of an optical disc that is in a state of no further writing by a recording completion process; (b) calculating data recordable capacity of a free space in accordance with the last position information of already recorded data and the information of initial data recordable capacity of the optical disc; and (c) recording data in the free space after the last position of already recorded data.

According to another aspect of the present invention, there is provided an optical disc recording apparatus, comprising: a detecting device that detects last position information of already recorded data and information of initial data recordable capacity of an optical disc that is in a state of no further writing by a recording completion process; a calculating device that calculates data recordable capacity of a free space in accordance with the last position information of already recorded data and the information of initial data recordable capacity of the optical disc; a recording device that records data in the free space after the last position of already recorded data; and a controlling device that controls the detecting device, the calculating device and the recording device.

According to further aspect of the present invention, there is provided an optical disc reproducing apparatus, comprising: a detecting device that detects a marking at a predetermined position of an optical disc that is in a state of no further writing by a recording completion process; a scanning device that scans an area after a last position of already recorded data when the detecting device detects the marking; and a reading device that reads data recorded in the scanned area after a last position of already recorded data.

According to yet further aspect of the present invention, there is provided an optical disc reproducing apparatus, comprising: a scanning device that scans an area after a last position of already recorded; and a reading device that reads data recorded in the scanned area after a last position of already recorded data.

According to the present invention, data can be recorded also in a free space of the optical disc in a state of no further writing by the finalizing process.

Also, since a last position and a free space of the recorded data are recognized before recording data, whether data to be recorded can be recorded all in the free space or not can be recognized, and data can certainly be recorded in the free space.

Further, when the optical disc is reproduced in accordance with the standard, data recorded in this area is managed as hidden data because the data recorded in an area after a last position of the previously recorded data (a free space) of an optical disc that is in a state of no further writing with a finalizing process cannot be reproduced.

In addition to the above, when data is recorded in the free area with the session format, starting point information of each data can be recognized without scanning all data recorded in the free space because the TOC information (index information) is recorded in the lead in area.

Further, when data is recorded in the free space with a format only with the program area, data can certainly be recorded in the case that capacity in the free space is small or that there is a large amount of data to be recorded.

Further, data can be recorded in most suitable state corresponding to the capacity of the free space and data to be recorded by selecting the format only with the program area or the session format to record data corresponding to the obtained data writable capacity in the free space and the capacity of data to be recorded.

Further, when data is recorded in the free space of the optical disc that is in a state of no further writing with the finalizing process, a blank area is provided between the recording data area and the data area to record in the free space. Then when the optical disc recorded data with this recording method is reproduced in accordance with the standard, reproducing data recorded in the free space can be prevented even if the data outside of the recording area is reproduced.

Also, when the optical disc that is in a state of no further writing with a finalizing process records data in the free space, by recording a mark at a predetermined position, whether there is a mark or not is checked and whether data is recorded in the free space of the optical disc that is executed the finalizing process or not can easily recognized.

Further, when marking at the predetermined position of the optical disc is detected, reading method of the optical disc, reproducing apparatus scans an area after the data executed the finalizing process and reads out data by being recorded in this area. Therefore, although the area after the last recorded data is primary a free space in an optical disc processed with the recording related process to be no further writable, the data recorded in that area can be read.

Further, reading method of the optical disc reproducing apparatus scans an area after the data executed the finalizing process and reads out the recorded data in an area after the data executed the finalizing process in the case that there is a recorded data. Therefore, although the area after the last recorded data is primary a free space in an optical disc in a state of no further writing with the finalizing process, the data recorded in that area can be read.

Also, by reading an optical disc recording program and an optical disc reproducing program in the existing optical disc recording apparatus, the optical disc recording apparatus can record data in the free space of the optical disc that is in a state of no further writing with the finalizing process. Therefore, since a user does not need to purchase a new optical disc recording/reproducing apparatus according to the embodiment of the present invention, the burden imposed on the user will be lightened.

BRIEF DESCRIPTION OF THE DRAWINGS

FIG. 4 is a flow chart for explaining an operation of an optical disc recording/reproducing apparatus according to the present invention.

FIG. 11 is a diagram showing a finalizing process by writing software.

FIG. 12 is a diagram showing a data structure of a CD extra.

DETAILED DESCRIPTION OF THE PREFERRED EMBODIMENTS

Figure 1:
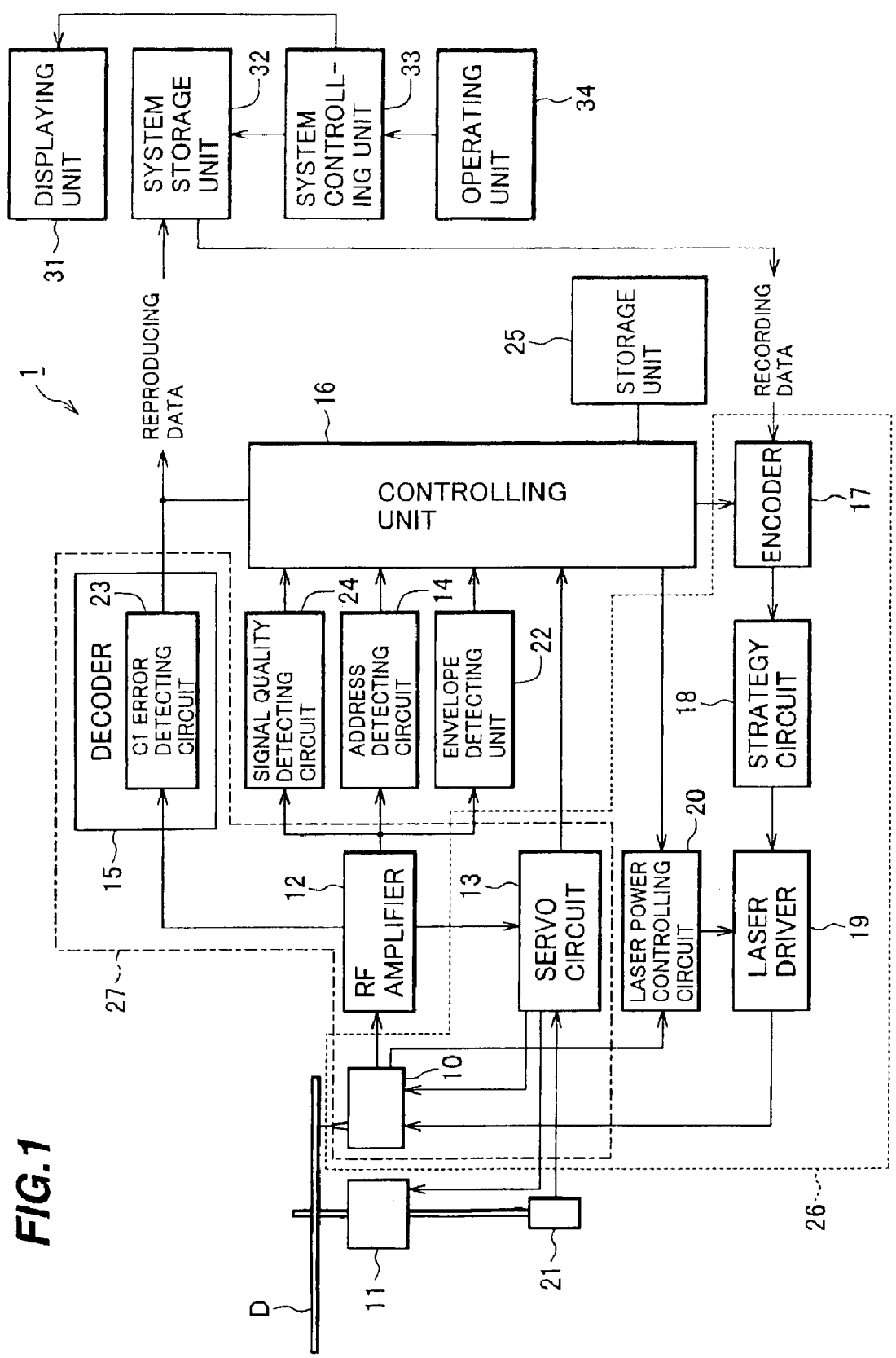
FIG. 1 is a block diagram showing a structure of an optical disc recording apparatus according to an embodiment of the present invention.

FIG. 1 is a block diagram showing a structure of an optical disc recording apparatus according to the embodiment of the present invention. As shown in FIG. 1, the optical disc recording apparatus equips an optical pickup 10, a spindle motor 11, a RF amplifier 12, a servo circuit 13, an address detecting circuit 14 that is a detecting means, a decoder 15, a controlling unit 16 that is a controlling means and a calculating means, an encoder 17, a strategy circuit 18, a laser driver 19, a laser power controlling circuit 20, a frequency generating device 21, an envelope detecting circuit 22, a C1 error detecting circuit 23, a signal quality detecting circuit unit 24, a storage unit 25, a displaying unit 31, a system controlling unit 33 and an operating unit 34. Also, a recording unit 26 that is a recording means is consisted of the optical pickup 10, the servo circuit 13, the encoder 17, the strategy circuit 18, the laser driver 19 and the laser power controlling circuit 20. Further, a data-reading unit 27 that is a reading means is consisted of the optical pickup 10, the RF amplifier 12, the servo circuit 13 and the decoder 15.

The spindle motor 11 is a motor that rotates an optical disc D (CD-R) that is a target of the data recording. Also, on a tip point of the axis of rotation of the spindle motor, an optical disc chucking mechanism (not shown) that is consisted of a turn table and the like for chucking an optical disc is provided. The optical pickup equips an optical system such as a laser diode, a lens and a mirror, a returning light (reflected light) receiving element, a focus servomechanism and the like. Also, a laser light is irradiate to the optical disc D at a time of recording and reproducing, and the returning light from the optical disc D is received. Then the receiving signal, an RF signal that is executed an eight to fourteen modulation (EFM), is output to an RF amplifier 12. Further, the focus servomechanism is a servomechanism that keeps a fixed distance between a lens of the optical pickup 10 and a data-recording surface. Also, the optical pickup 10 equips a monitor diode, and an electric current to be provided to a laser power controlling circuit 20 is generated on the monitor diode by the returning light of the optical disc D.

The frequency-generating device 21 detects a relative position of the optical disc output by the spindle motor 11 and outputs a signal for detecting a rotation angle and a rotation speed of the optical disc to the servo circuit 13.

The RF amplifier 12 amplifies an EFM modulated RF signal provided from the optical pickup 10 and outputs an amplified RF signal to the servo circuit 13, the address detecting circuit 14, the envelope detecting circuit 22, the recording quality detecting circuit unit 24, and the decoder 15.

The decoder 15 executes EFM demodulating of EFM modulated RF signal provided from the RF amplifier 12 to generate reproducing data and output to a data storage circuit 25. Also, at a time of data recording, the decoder 15 executes EFM demodulation of the RF signal provided from the RF amplifier 12 when an area recorded by a test recording is reproduced. Then a C1 error detecting circuit 23 detects C1 error in accordance with the demodulated signal and outputs to a controlling unit 16. The C1 error detecting circuit 23 performs an error correction by using an error correction code called Cross Interleaved Read Solution Code (CIRC) to the EFM demodulated signal and detects the number of frames to which the first error corrections are impossible with in one sub-code frame (98 EFM frames), i.e., the number of the C1 error (the C1 error value).

In an optical disc recording/reproducing apparatus 1 according to the embodiment of the present invention, a test recording is executed in a PCA area on an inner track side of the optical disc D before an actual recording. It is consisted to request a recording speed that can execute a satisfactory recording to the optical disc D in accordance with the reproducing result of the area recorded this test. The C1 error detecting circuit 23 detects C1 error of the reproducing signal in the area recorded this test to output to the controlling unit 16.

The address detecting circuit 14 extracts a wobble signal component from the EFM signal provided from the RF amplifier 12 and demodulates time information of each position contained in this wobble signal component, distinguishing information (disk ID) to distinguish the optical disc and information that indicates disk type such as coloring matter of the disk to output to the controlling unit 16.

The signal quality detecting circuit unit 24 calculates $\beta$ (asymmetry) from the RF signal provided from the RF amplifier as a parameter concerning to reproducing signal quality when the test recording area of the optical disc D is reproduced and output the calculated result to the controlling unit 16. The $\beta$ can be calculated by an equation, $\beta=(a+b)/(a-b)$, where "a" is a peak level (a positive value) of the EFM modulated signal wave, and "b" is a bottom level (a negative value).

The envelope detecting circuit 22 detects an envelope of the EFM signal in the count region 112b of the above-described optical disc D in order to detect a point where the test recording is started in the test region of the optical disc D before actually starting the test recording to the optical disc D.

The servo circuit 13 executes a rotation control of the spindle motor 11, a focus control of the optical pickup 10, a tracking control and a send control. The optical disc recording/reproducing apparatus 1 according to the embodiment of the present invention can select a recording method from a constant angular velocity (CAV) method that drives the optical disc D with a constant angular velocity and a constant linear velocity (CLV) method that drives the optical disc D with a constant linear velocity by switching to each other. Therefore, the servo circuit 13 changes the CAV method and the CLV method according to the controlling signal provided from the control unit 16. In the CAV control, the servo circuit 13 controls a rotation velocity of the spindle motor 11 detected by the frequency-generating device 21 to be agreed with the pre-determined rotation velocity. In the CLV control, the servo circuit 13 the spindle motor 11 to make a wobble signal that is EFM modulated and supplied from the RF amplifier be a linear velocity magnification.

The encoder 17 executes EFM modulation to the recorded data output from the system storage unit 32 to output to the strategy circuit 18. The strategy circuit 18 executes a time axis correcting system to the EFM signal from the encoder 17 to output to the laser driver 19 boots laser diode of the optical pickup 10 according to the modulated signal according to the recorded data provided from the strategy circuit 18 and the controlling signal of the laser power controlling circuit 20.

The laser power controlling circuit 20 controls power of the laser light irradiated from the laser diode of the optical pickup 10. Concretely, the laser power controlling circuit 20 controls the laser driver 19 so that laser light with a most suitable laser power irradiated from the optical pickup 10 in accordance with electric current value provided from the monitor diode of the optical pickup 10 and information representing a target value of a most suitable laser power provided from the controlling unit 16.

The controlling unit 16 is consisted of a CPU, a ROM, a RAM and the like and controls each part except the displaying unit 31, the system storage unit 32 and the operating unit 34 of the optical disc recording/reproducing apparatus 1 in accordance with a program stored in the ROM. The controlling unit 16 controls each part of the apparatus to execute test recording to a predetermined area of the optical disc D set in the optical disc recording/reproducing apparatus before data of an actual recording as described in the above. Then, the controlling unit 16 executes a recording speed judging process that gets recordable speed of satisfactory recording without recording error to the optical disc D to which the optical disc recording/reproducing apparatus 1 execute test recording in accordance with the signal quality such as $\beta$ value and the like detected by the signal quality detecting circuit 24 and a count of the C1 error detected by the C1 error detecting circuit 23 from the signal obtained by reproducing the area where the above-described test recording has been executed.

The storage unit 25 is for recording data obtained by an experiment and the like in advance and firmware of the optical disc recording/reproducing apparatus 1.

The displaying unit 31 is for displaying signal quality of data recorded in the optical disc and information to transmit from the optical disc recording/reproducing apparatus 1 to a user.

The system storage unit 32 is for storing reproducing data of the optical disc D output from the decoder 15, data input from an external unit of the optical disc recording/reproducing apparatus 1, and writing software for the optical disc. When data is recorded in an optical disc for recording, data stored in the system storage unit 32 is output to the encoder 17.

The system controlling unit 33 is for controlling whole the optical disc recording/reproducing apparatus 1 and controls the controlling unit 16, the displaying unit 31, the system storage unit 32, and the operating unit 34. Also, the system controlling unit 33 reads a program (software) that the system storage unit 32 stores to execute it.

The operating unit 34 is for executing each control and operation of the optical disc recording/reproducing apparatus 1 by the user.

Next, an operation at a time of data recording to further writing type optical disc D that is in a state of no further writing that is recorded no further writing information with a finalizing process is explained. Further, the optical disc that is in a state of no further writing with a finalizing process normally is not recorded any data after a last data. Also, even if data is recorded after the last data, and if this optical disc is reproduced with an optical disc recording/reproducing apparatus that is not according to the present invention and this optical disc is reproduced with an optical disc reproducing apparatus (hereinafter called the optical disc recording/reproducing apparatus and the optical disc reproducing apparatus), data cannot be reproduced. Therefore, data to be recorded free space of the optical disc that is in a state of no further writing with a finalizing process is called a hidden data because existence is not sure for the already existing optical disc recording/reproducing apparatus and the already existing optical disc the reproducing apparatus.

When the optical disc recording/reproducing apparatus 1 according to the present invention records new data in the free space of the optical disc that is in a state of no further writing with a finalizing process, it acquires last position information of the recorded data in the optical disc. Then it records information after the last position of data in accordance with the information.

Concretely, in a case of a single session, a starting position of the lead out area is obtained from the TOC information of the optical disc, and the last position information of data is obtained. Also, in the case of a multi session, a starting position of the lead out area is obtained from the TOC information of the last session of the optical disc, and the last position information of data is obtained.

Also, the last position information of data is obtained as described in the above, and capacity of free space of the optical disc (an initial data recording capacity) is obtained. Concretely, a data recording capacity in the free space is obtained from the last position information of the recorded data in the optical disc and the information of the initial data recording capacity. That is, the amount of the recorded data in the optical disc can easily calculated from the last position information (time information) of the data. Also, a possible starting time of a maximum lead out is recorded as Special information 3 (a LLO information at a time of a sub code M1:S1:F1=1:1:1) of ATIP information in the optical disc. Therefore, the initial data recording capacity of the optical disc is calculated from this information. Then a capacity of a free space is obtained by calculation from the amount of the recorded data in the optical disc and the initial data recording capacity.

As doing that, a starting point and a free space of the optical disc that is in a state of no further writing with a finalizing process is obtained.

Next, a data recording method to a free space of the optical disc that is in a state of no further writing with a finalizing process is explained. FIG. 2 is a diagram showing a data structure stored in a free space of the optical disc that is in a state of no further writing with a finalizing process. In the present information, recording can be executed with either a session format consisted of a lead in area, a program area and a lead out area or a format only in a program area. Also, in the present invention, a method to record hidden data from an end of a last lead out of data executed a finalizing process and a method to record data by providing a predetermined blank area (also called a gap) from an end of a last lead out of data executed a finalizing process can be selected.

Figure 2A:
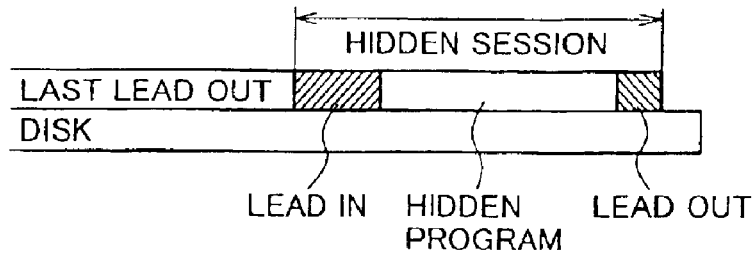
FIG. 2 is a diagram showing a data structure stored in a free space of the optical disc

First, a method to record hidden data with a session format from an end of a last lead out is explained. When hidden data is recorded from an end of a last lead out with a session format that is a basic format to record data to the optical disc, a program area of hidden data is recorded from a position of the last lead out position plus one minute thirty seconds as shown in FIG. 2A in a case of a single session. Also, in a case of a multi session not shown in the figure, a program area of hidden data is recorded from a position of the last lead out position plus thirty seconds. Then the lead in and the lead out are recorded after recording a desired data to the program area. Further, a method to record data to the program area may be any methods in accordance with the standards such as the DAO, TAO, SAO, etc.

When the hidden data is recorded with a format shown in FIG. 2A, the lead in of the hidden session is read to reproduced the program area as same as the case of data executed a finalizing process at a time of reading hidden data. That is, since a position information (time information) of data recorded in the program area can be obtained by the TOC information of the lead in area by recording data with the session format, the position information of each data can be recognized without scanning whole the hidden data area.

Next, the method to record the hidden data from the end of the last lead out with the format only in the program area is explained. Most of the optical discs in a state of no further writing with a finalizing process normally tend to have small vacant capacity (a small free space). Therefore, when data is recorded with the session format in the above, all the data to be recorded in the program area may not be recorded because the lead in area and the lead out area should be secured. Therefore, in the present invention, in the case that the vacant capacity of the optical disc is small and the amount of data is large, data is recorded with the format only in the program area as shown in FIG. 2B.

Further, when a plurality pf data is recorded in the program area, the data may be recorded discretely with predetermined spaces.

Figure 2B:
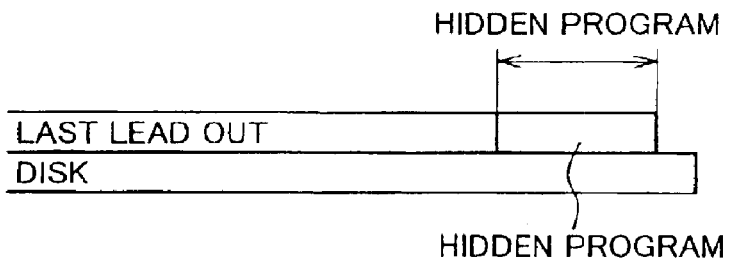

In the case that the hidden data is recorded with the format shown in FIG. 2B, when the hidden data is read, a recording format is recognized by reading a header and a sub code of the recorded data in the program area, and a problem doe not occur without providing the lead in area. Also, in the case that a plurality of data is recorded in the program area, the problem does not occur by setting the optical disc reproducing apparatus to stop reading automatically when there is no data.

Figure 2C:
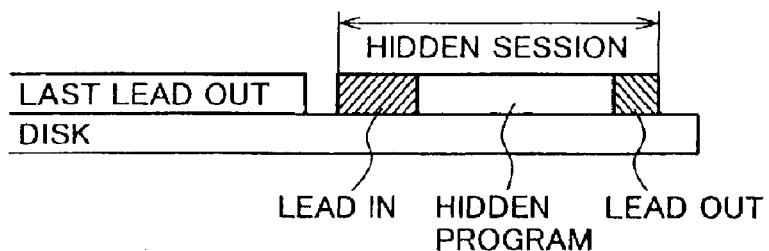
Figure 2D:
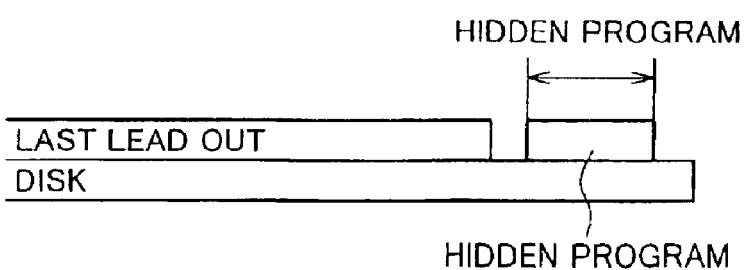

Next, the method to record data by providing a predetermined blank area from the end of the last lead out of data executed a finalizing process is explained. As the method in the above, if the hidden data is recorded from the end of the last lead out, there is no obstacle on reproducing of data executed a finalizing process. Also, the already existing optical disc reproducing apparatus normally cannot reproduce the hidden data. However, in the case that the already existing optical disc reproducing apparatus reproduces the lead out to the end by mistake and that the optical pickup moves to the hidden area by being added a vibration and a shock from the external unit during reproducing data, the already existing optical disc reproducing apparatus may reproduce the hidden data. Then, as shown in FIGS. 2C and 2D, data is recorded by providing a blank area consisted of a predetermined blank track at the end of the last lead out of data executed a finalizing process. By that, if the above problem occurs, the already existing optical disc reproducing apparatus can prevent reproducing the hidden data.

As shown in FIG. 2C, when the hidden data is recorded with the session format, the program area of the hidden data is recorded from the position of the last lead out position plus a predetermined blank area plus one minute 30 seconds in the case of the single session. Also, in the case of the multi session, the program area of the hidden data is recorded from the position of the last lead out position plus a predetermined blank area plus thirty seconds. Then after recording a desired data in the program area, the lead in and the lead out are recorded. Further, as same as the method described before, a method to record data to the program area may be any method to record data to the optical disc such as the DAO, the TAO and the SAO.

In the case that the hidden data is recorded with a format shown in FIG. 2C, when the hidden data is read, the TOC information recorded in the lead in of the session is read to reproduce the program area as same as the case of data executed a finalizing process.

Since the position information of data recorded in the program area can be obtained from the TOC information in the lead in area by recording data with the session format, the position information of each data easily can be read without scanning whole the hidden data area.

Most of the optical discs that are in a state of no further writing with a finalizing process are normally small vacant capacity. Therefore, when data is recorded with the session format in the above, all the data to be recorded in the program area may not be recorded because the lead in area and the lead out area should be secured.

Therefore, in the present invention, in the case that the vacant capacity of the optical disc is small and the amount of data is large, data is recorded with the format only in the program area by providing a blank area consisted of a predetermined blank track from an end of a last lead out of data executed a finalizing process as shown in FIG. 2D. Further, when a plurality pf data is recorded in the program area, the data may be recorded discretely with predetermined spaces.

In the case that the hidden data is recorded with the format shown in FIG. 2D, when the hidden data is read, a recording format is recognized by reading a header and a sub code of the recorded data in the program area, and a problem doe not occur without providing the lead in area. Also, in the case that a plurality of data is recorded in the program area, the problem does not occur at a time of reading data by setting the optical disc reproducing apparatus to stop reading automatically when there is no data.

The method to record the hidden data is not limited to the method in the above, and it may be other method.

Also, in the present invention, when the hidden data is recorded in the optical disc that is in a state of no further writing with a finalizing process, marking on a predetermined position may be performed. FIG. 3 is a schematic diagram of data structure when the hidden data is recorded in an optical disc that is in a state of no further writing with a finalizing process. When marking on the predetermined position is not executed, whether the hidden data is recorded in the free space of the optical disc that is in a state of no further writing with a finalizing process or not cannot easily be judged. Therefore, the optical disc recording/reproducing apparatus need to obtain a last position of the recorded data and confirm whether the hidden data is recorded or not by scanning free space. Then if there is a recorded data, the data is reproduced. Further, in this case, since free space should be scanned in order to read the hidden data, there is an effect that the existence of the hidden data becomes harder to be found.

Figure 3A:
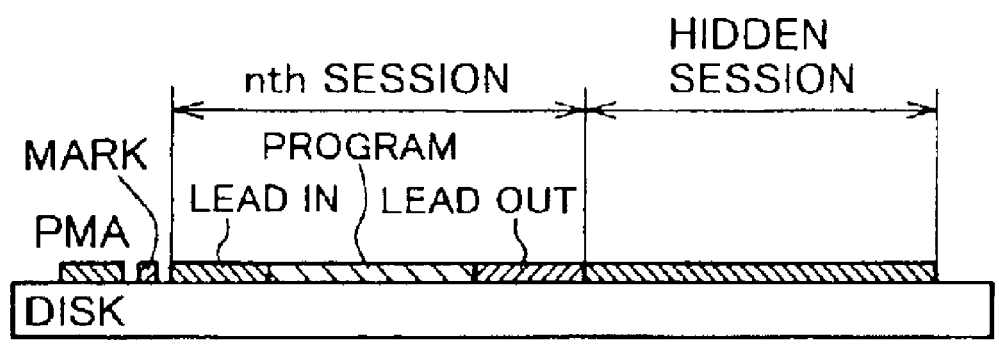
FIG. 3 is a schematic diagram of data structure when hidden data is recorded in an optical disc that is in a state of no further writing with a finalizing process.

When the hidden data is recorded in the optical disc that is in a state of no further writing with a finalizing process as shown in FIG. 3A, the optical disc recording/reproducing apparatus can confirm the predetermined marking by executing marking, and can easily confirm whether there is the hidden data or not.

Further, as a predetermined position to execute marking, a position in which data is not recorded normally such as a gap between the lead in area and a program memory area (PMA area) provided inner track position of the lead in area and a gap between the before-described PMA area and a power calibration area (PCA area) provided inner track position of the PMA area are ideal.

Further, in the present invention, when the hidden data is recorded in the further writing type optical disc, a finalizing process is executed to record the hidden data in the case that a finalizing process of data to the optical disc is not executed. By that, the further writing type optical disc recorded data can be used as a hidden data disk.

Figure 3B:
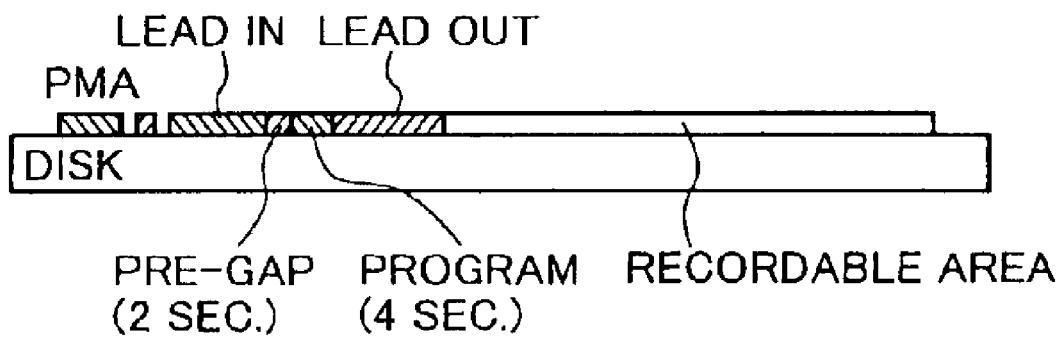

Further, in the present invention, when any data is not recorded in the further writing type disk, only a minimum data that can be reproduced with the optical disc reproducing apparatus is recorded to execute a close session and a disk close. Then the hidden data is recorded in free space with a maximum free space. By that, a large amount of the hidden data can be recorded in the optical disc. As shown in FIG. 3B, "2 seconds pre-gap and 4 seconds data" is recorded in the program area in accordance with the standard. Therefore, by recording the hidden data in a free space after recording the lead in area, a two-second pre-gap, four-second data (for example, a silence state (a digital silence)), and a lead out area, when the optical disc is reproduced by a conventional optical disc reproducing apparatus, a silence state for four seconds as a data is reproduced and thereafter the reproduction will be stopped so that there is no risk of an error operation. Also, the hidden data will not be reproduced with the conventional optical disc reproducing apparatus.

Figure 5:
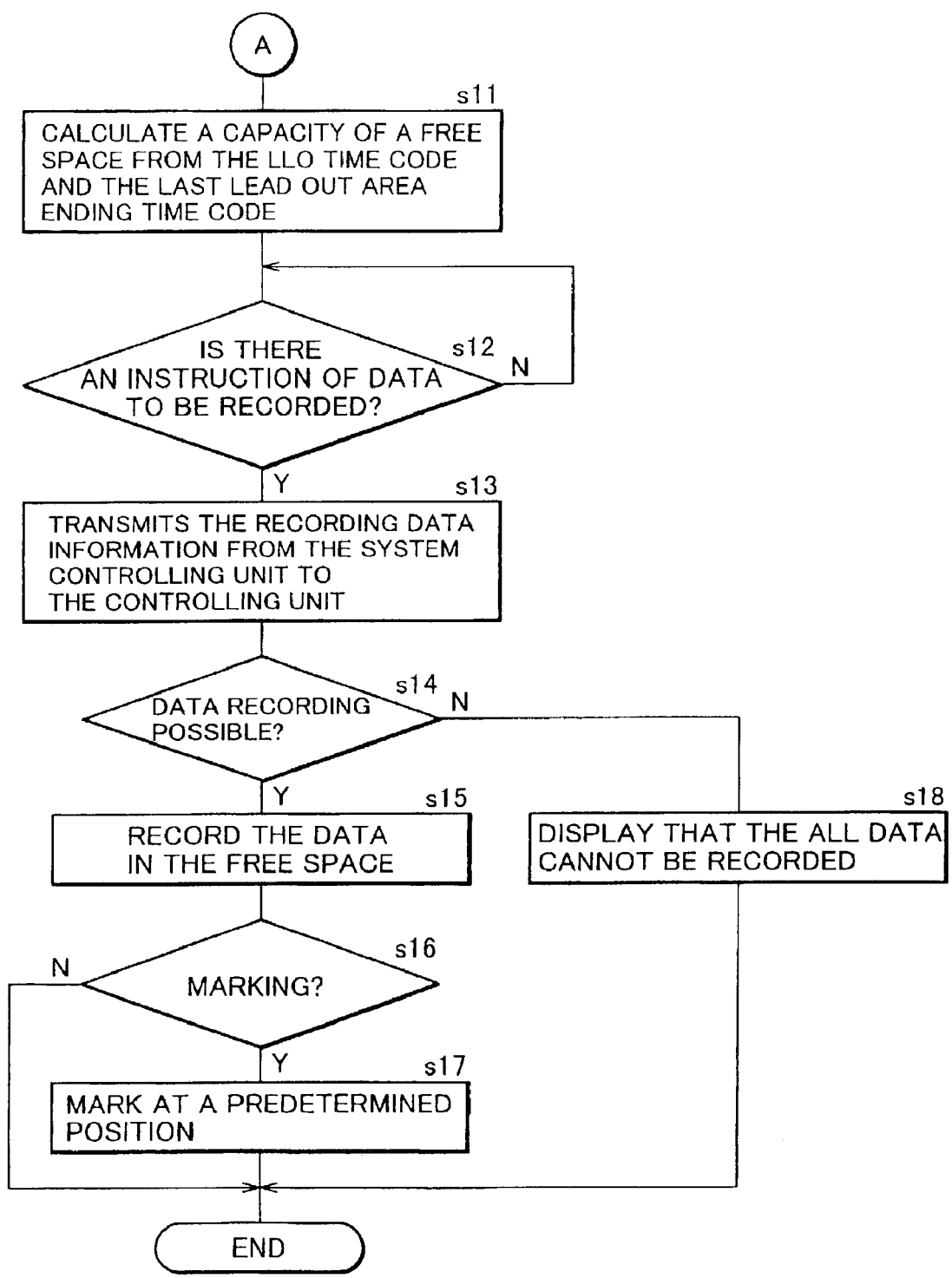
FIG. 5 is a flow chart for explaining an operation of the optical disc recording/reproducing apparatus according to the present invention.
Figure 6:
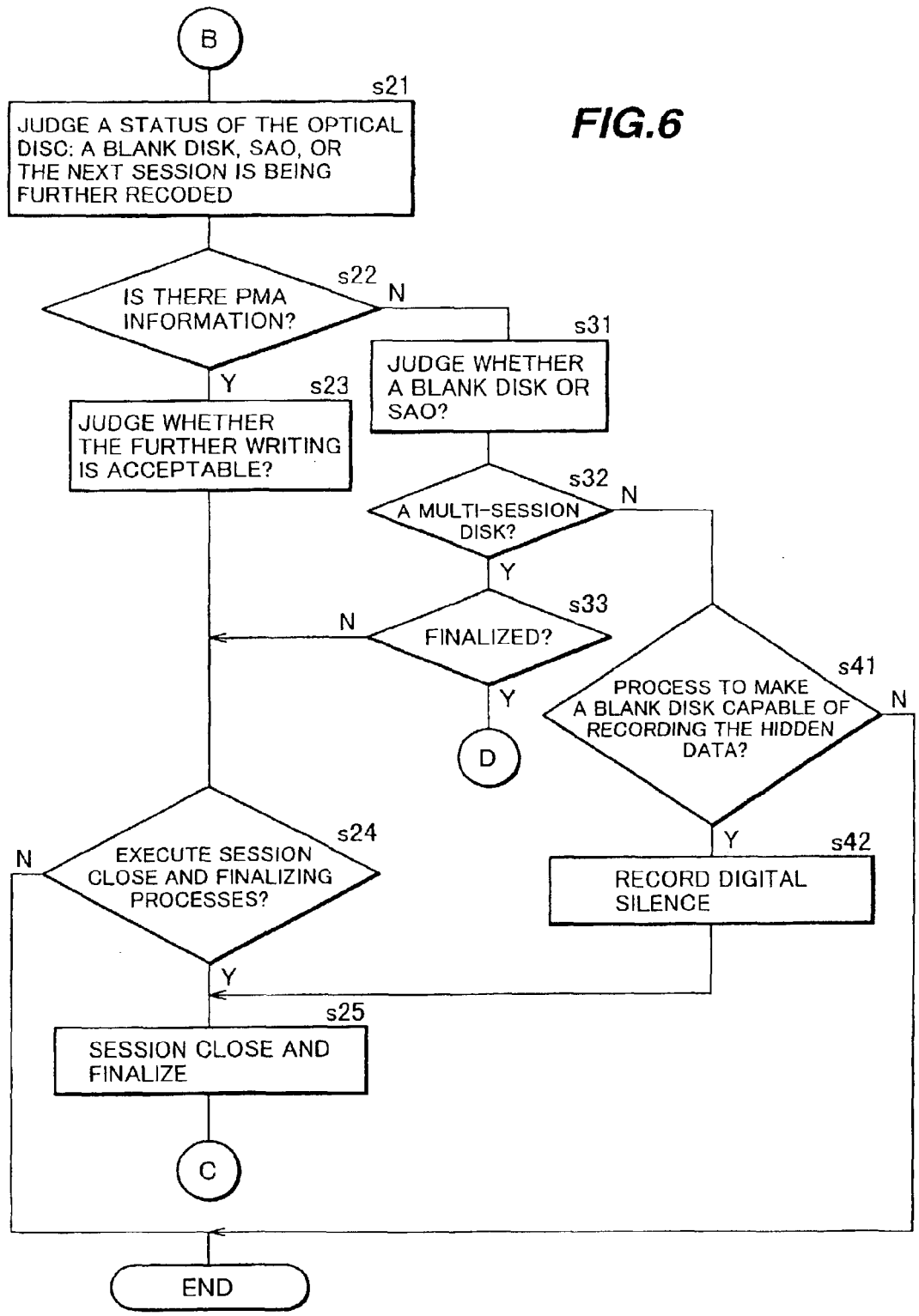
FIG. 6 is a flow chart for explaining an operation of the optical disc recording/reproducing apparatus according to the present invention.
Figure 7A:
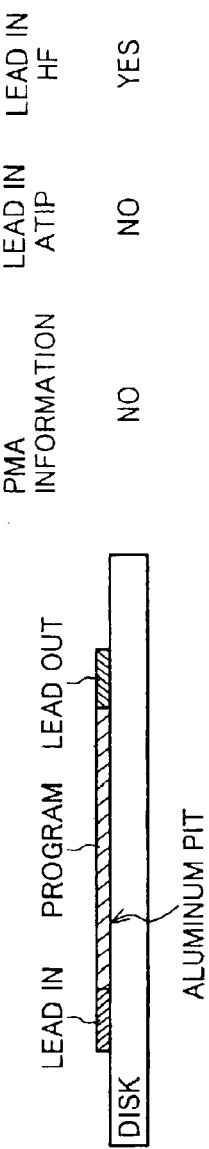
FIG. 7 is a diagram showing a structure of a state of the optical disc.
Figure 7B:
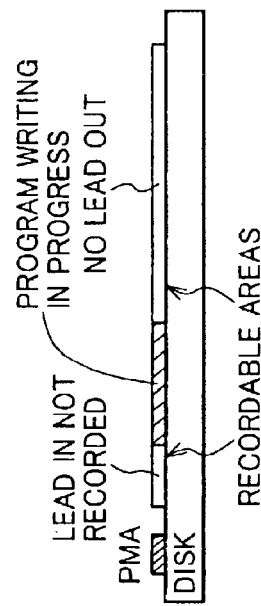
Figure 7C:
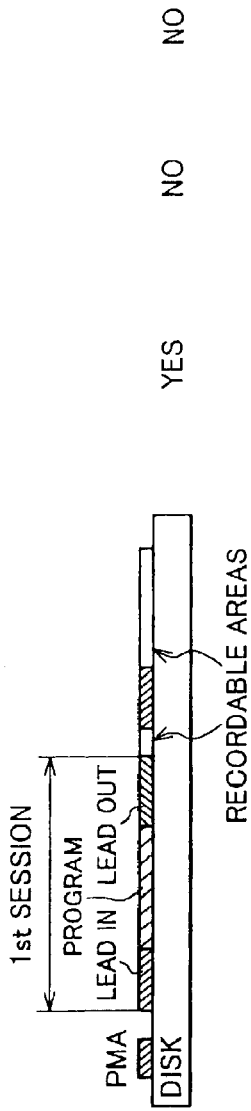

Next, concrete operations of the optical disc recording/reproducing apparatus 1 according to the present invention are explained by using flow charts. FIGS. 4 to 6 are flow charts for explaining operations of the optical disc recording/reproducing apparatus according to the present invention. Also, FIG. 7 is a diagram of structure showing a state of the optical disc. As shown in FIG. 4, the optical disc is set to the optical disc recording/reproducing apparatus 1, and writing software is booted from the operating unit 34 by a user. Then, when an instruction to record the hidden data is input, the system controlling unit 33 transmits an instructing signal to confirm a recording state of the optical disc to the controlling unit 16 (Step s1). The controlling unit 16 received this signal moves the optical pickup 10 to the lead in area of the first session via a servo circuit and reads a reflecting signal (Step s2). At this time, a position of the lead in area is fixed to be φ46 to 50 mm. Then, the controlling unit 16 makes the optical pickup 10 confirm ATIP information (Step s3) in order to confirm whether there is ATIP information on a track in the lead in area. If there is no ATIP information, the controlling unit 16 terminates the process (Step s4) because the optical disc is read only disk and it cannot be further recorded as shown in FIG. 7A.

On the other hand, in the case that there is ATIP information at Step s3, the controlling unit 16 reads a maximum lead out possible starting time (a maximum possible lead out area time code) from ATIP special information 3 to obtain (Step s5) because the apparatus can execute further writing. Then the controlling unit 16 makes the optical pickup 10 detect whether there is a HF signal in the reflective signal in the lead in area (Step s6).

In the case that there is the HF signal in the reflective signal in the lead in area, the HF signal is decoded at the decoder 15. The controlling unit 16 detects the multi session information in the sub code signal (Step s7), and judges whether it is a multi session or not (Step s8). When it is a multi session, the controlling unit 16 make the optical pickup 10 reproduce information in an area to be formed a lead in area of a next session (Step s9). Further, at this time, the controlling unit 16 preserves that it is a multi session in the internal RAM. Then the process of s6 is executed again.

At Step s8, in the case that it is not the multi session, the controlling unit 16 detects an ending time code (a last position information) of data recorded in the lead in area of the optical disc with the optical pickup 10 to reserve in the internal RAM (Step s10).

As shown in FIG. 5, the controlling unit 16 calculates a capacity of free space from the LLO time code obtained at Step s5 and the ending time code of the last lead out area obtained at Step s10 (Step s11). Then the system controlling unit 33 makes the displaying unit 31 indicate display to encourage an instruction of data to be recorded to the optical disc, an instruction whether a blank area is provided or not between the hidden data and the recorded data and an instruction whether marking is executed or not on a predetermined position after recording the hidden data to the user, and stands by until an instruction is input from the operating unit 34 (Step s12).

When the instruction concerning to data to be recorded to the optical disc and recording method is input from the operating unit 34, the system controlling unit 33 transmits information concerning to data information and recording method which are output from the system storage unit 32 to the controlling unit 16 (Step s13).

The controlling unit 16 calculates whether data instructed in free space with the recording method instructed from the user can be recorded or not. Also, in the case that data to be recorded can be recorded in free space, the controlling unit 16 calculates which of the format only in the program area and the session format data can be recorded (Step s14).

In the case that the controlling unit 16 can record data in the free space with either format of the above formats, data is recorded with a most suitable format in accordance with the calculated result and instructed by the user as shown in FIG. 7F (Step s15). That is, when the calculated data recording capacity of the free space allows data to be recorded in the format only with a program area, the data will be recorded in the format only with a program area. Also, in the case that the data recordable capacity of the calculated free space is a capacity that can be record data with the session format consisted of the lead in area, the program area and the lead out area, data is recorded with the session format. Further, when an instruction to provide a blank area is instructed by the user, the blank area is provided between the recording data area and the data area to record in the free space, and data is recorded with either of the above formats.

At Step s1, when the controlling unit 16 receives an instruction to mark at a predetermined position by the user (Step s16), marking is executed (Step s17) in a predetermined area as shown in FIG. 7G and finishes the process. On the other hand, when the controlling unit 16 does not receive the marking instruction, it finishes the process.

At Step s14, when all the data cannot be recorded in the free space by the result of the judgment, the controlling unit 16 outputs a signal to inform that to the system controlling unit 33. The system controlling unit 33 received this signal displays that all the data cannot be recorded in the free space on the displaying unit 31 (Step s31) to finish the process.

At Step s6 shown in FIG. 4, in the case that there is no HF signal, the controlling unit 16 judges a state of the optical disc from one of states: a blank state wherein no data is recorded, a state wherein the data is recorded in the SAO format with the closed session but without the disk close, a state wherein the data is recorded in the SAO format with the closed session and the disk close, and a state wherein the data is recorded in the TAO format and another data is further recorded without forming a lead in. Then the controlling unit 16 moves the optical pickup 10 to the PMA area and makes the optical pickup 10 detect information of the PMA area (Step s22).

If there is the PMA information, the controlling unit 16 judges whether the status of the disk is in the state that data is further written with the SAO format or the TAO format or in the state that no data is further written but capable of accepting further writing (Step s23). Then, the controlling unit 16 judges whether the close session and the disk close are executed or not (Step s24). That is, the controlling unit 16 transmits a signal that makes the displaying unit 31 indicate display to encourage to input whether the close session and the disk close are executed or not from the operating unit 34 to the system controlling unit 33. The system controlling unit 33 that received this signal makes the displaying unit 31 indicate display to encourage to input whether the close session and the disk close are executed or not from the operating unit 34.

When the operating unit 34 inputs that the close session and the disk close is executed, the system controlling unit 33 transmits a signal to the controlling unit 16 and instructs to execute the close session and the disk close. The controlling unit 16 received this instruction executes the close session and the disk close and makes the optical disc be in a state of no further writing (Step s25). Then the controlling unit 16 executes a process after s10 shown in FIG. 4.

On the other hand, at Step s24, when the operating unit 34 inputs that this process is not executed, it transmits a signal to inform it to the controlling unit 16 to finish the process.

Figure 7D:
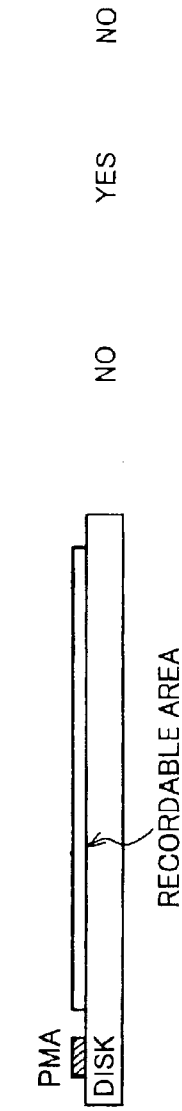

At Step s22, when there is no PMA information, the controlling unit 16 judges whether a status of the optical disc is in a blank state wherein no data is recorded as shown in FIG. 7D, in a state wherein the data is recorded in the SAO format with the closed session but without the disk close as shown in FIG. 7E, or in a state wherein the data is recorded in the SAO format with the closed session and the disk close (Step s31).

The controlling unit 16 confirms whether this optical disc is multi session or not in accordance with the data reserved in the RAM (Step s32). In the case of the multi session, the controlling unit 16 confirms whether the disk close is executed or not (Step s33). In the case that the disk close is executed, s10 process shown in FIG. 4 is executed. On the other hand, in the case that the disk close is not executed, Step s24 process is executed. Further, when Step s25 process is executed following to Step s24, a last session id recorded with a session format consisted of the lead in area explained in accordance with FIG. 3B, 2 seconds of pre-gap, 4 seconds of data and the lead out area, and the close session and the disk close are executed.

At Step s32, in the case of not a multi session, the optical disc is judged as a blank disk, and the controlling unit 16 judges whether a process to make the optical disc capable of recording the maximum amount of the hidden data is executed on the optical disc or not (Step s41). That is, the controlling unit 16 transmits a signal to the system controlling unit 33 in order to make the displaying unit 31 indicate display to encourage to input whether the process is executed or not to make the optical disc capable of recording the maximum amount of the hidden data. The system controlling unit 33 received this signal makes the displaying unit 31 indicate display to encourage the user to input with the operating unit 34 whether the process is executed or not to make the optical disc capable of recording the maximum amount of the hidden data When the operating unit 34 inputs that the above process is not executed on the optical disc, the system controlling unit 33 transmits a signal to inform that to the controlling unit 16 to finish the process.

On the other hand, the operating unit 34 inputs that the above process is executed on the optical disc, the system controlling unit 33 transmits a signal to the controlling and instructs to execute the above the process. The controlling unit 16 outputs a predetermined signal to the servo circuit 13 and controls the optical pickup 10 and records minimum amount of data so that the apparatus will not perform an incorrect action even if this optical disc is reproduced with the optical disc recording/reproducing apparatus and the optical disc reproducing apparatus. That is, as shown in FIG. 3B, 2 seconds of pre-gap and 4 seconds of digital silence are recorded in the program area of the optical disc (Step s42). Then the close session and the disk close are executed (Step s25), and a process after Step s10 shown in FIG. 4.

Figure 8:
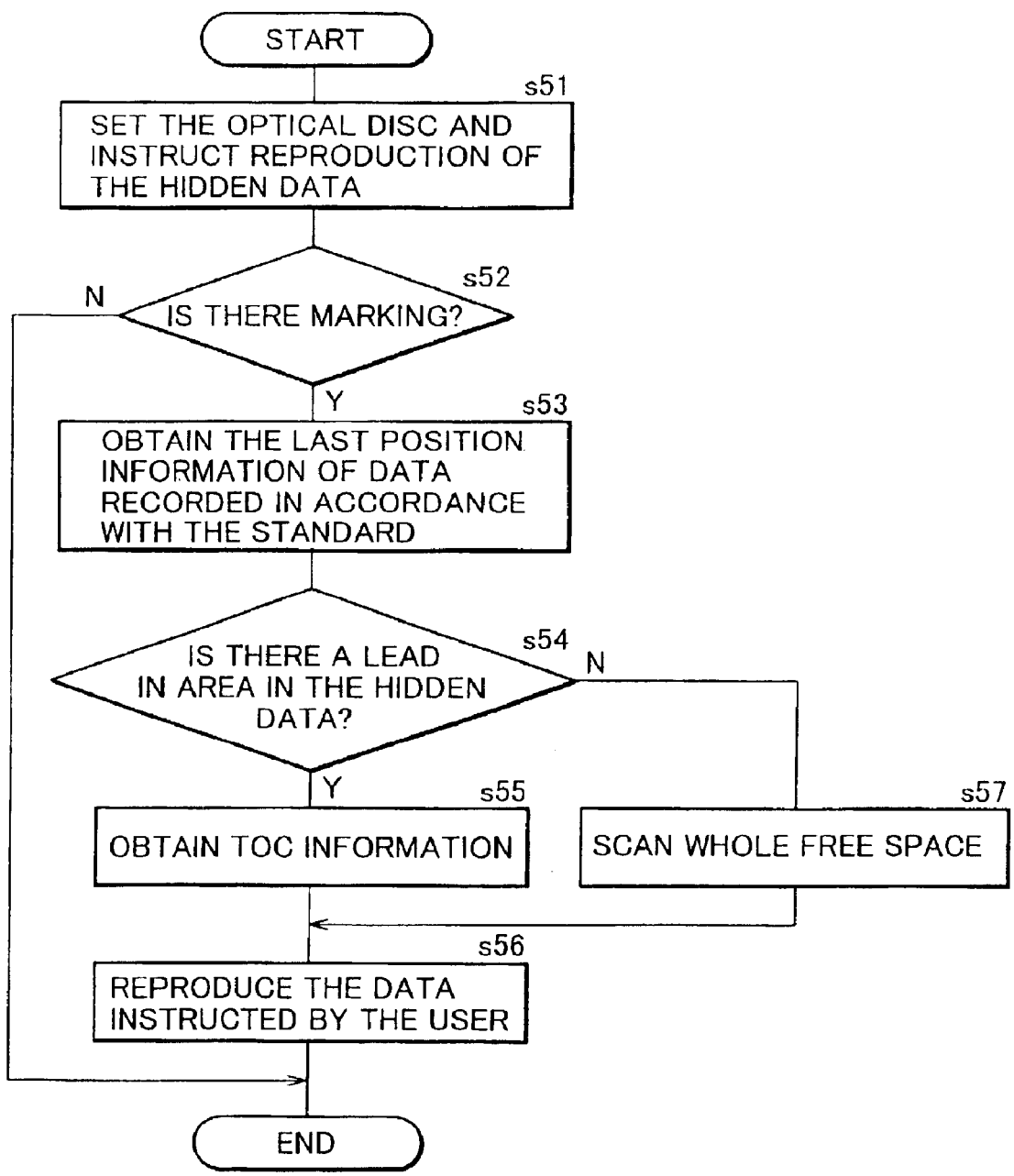
FIG. 8 is a flow chart for explaining an operation to reproduce hidden data with the optical disc recording/reproducing apparatus.

Next, it will be explained that a reading operation of the hidden data in an optical disc, in the state wherein the further writing is prohibited by the recording completing process, to which the hidden data is recorded in the area after the last session (the area after the last position of the recorded data). FIG. 8 is a flow chart for explaining an operation to reproduce hidden data with the optical disc recording/reproducing apparatus.

First, the case of executing marking every time when the hidden data is recorded in the optical disc that is in a state of no further writing with a finalizing process is explained.

The optical disc is set in the optical disc recording/ reproducing apparatus 1, and the writing software is booted from the operating unit 34 by the user. When an input to reproduce the hidden data is executed, the system controlling unit 33 transmits a signal to instruct to confirm a recording state of the optical disc to the controlling unit 16 (Step s51). The controlling unit 16 that received this signal transmits a signal via the servo circuit and moves the optical pickup 10 to a predetermined position on which marking should be recorded to detect whether there is marking or not (Step s52). Here, a position of marking is determined in advance.

If there is no marking, the controlling unit 16 finishes the process because the hidden data is not recorded.

On the other hand, if there is marking, the controlling unit 16 obtains information of a last position of the recorded data in accordance with the standard because the hidden data is recorded (Step s53). Next, the controlling unit 16 moves the optical pickup 10 to a last position of data, and confirms (Step s54) whether there is the lead in area after the last position. Since the hidden data is recorded with session format in the case that there is a lead in area, information of each recorded data is obtained (Step s55) from the TOC information read from the lead in area, and the hidden data is reproduced (Step s56) according to an instruction of the user.

On the other hand, since the hidden data is recorded with program format in the case that there is no lead in area at Step s54, the whole area after the last position of data recorded in accordance with the standard is scanned, information of each recorded data is obtained to reserve in the RAM (Step s57). Also, when the information of each recorded data is recorded in a starting point of the program area, the starting point of the program area may be read. Then the hidden data is reproduced (Step s56) according to an instruction of the user.

Figure 9:
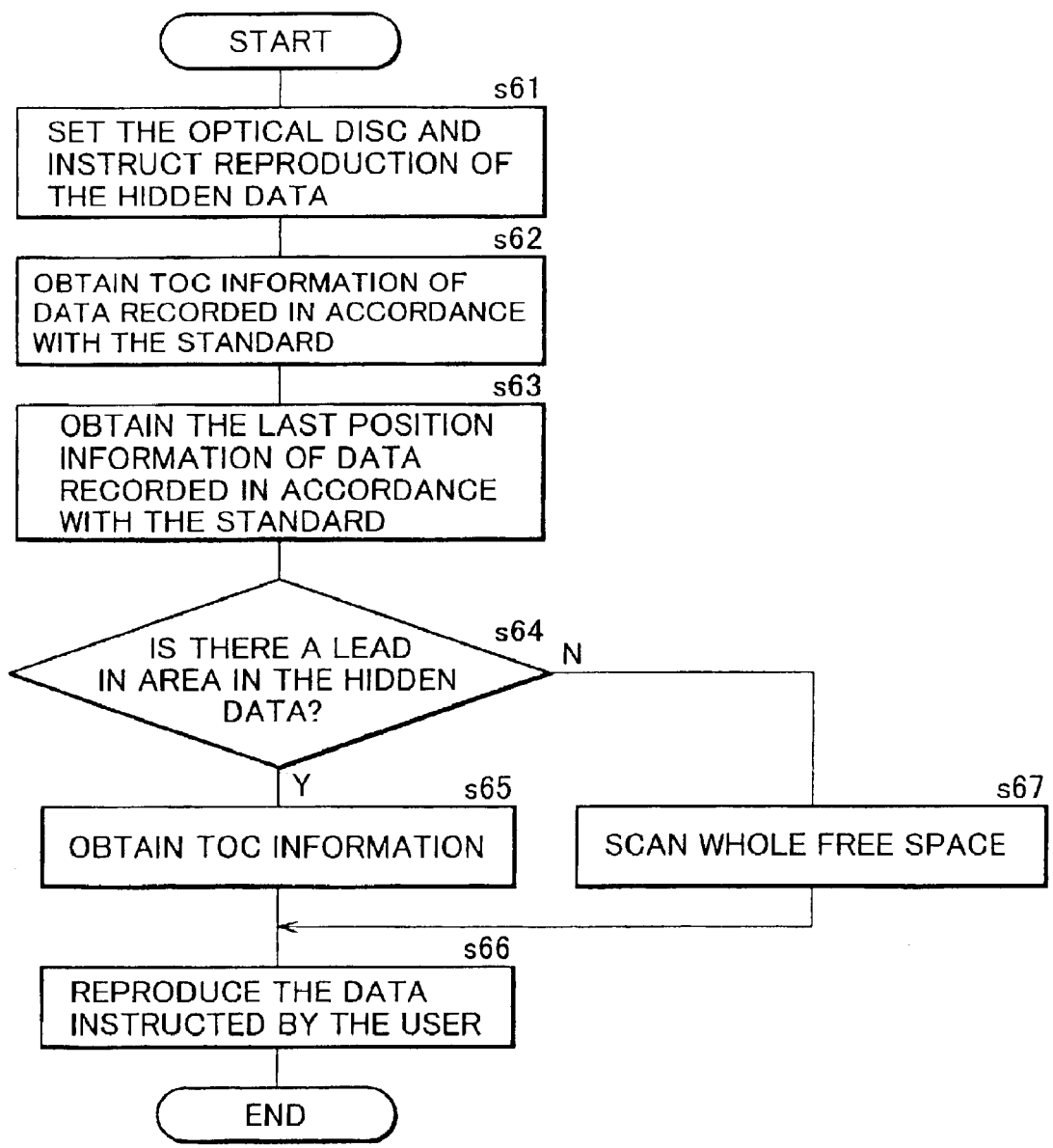
FIG. 9 is a flow chart for explaining another operation to reproduce hidden data with the optical disc recording/reproducing apparatus.
Figure 10A:
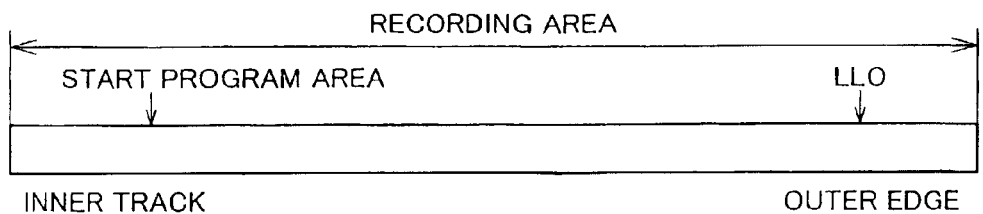
FIG. 10 is a diagram showing a data structure of the optical disc.
Figure 10B:
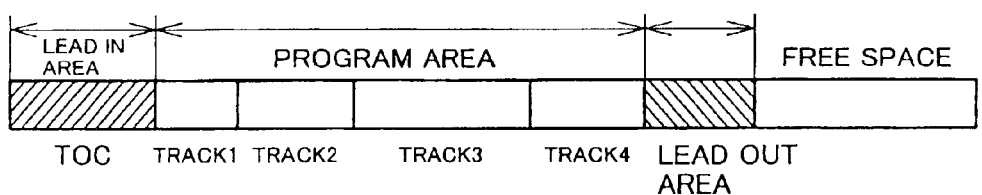
Figure 10C:
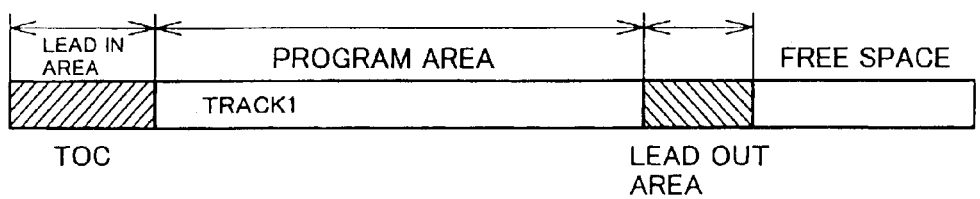
Figure 10D:
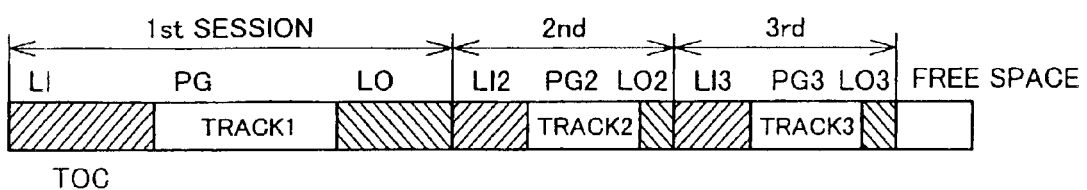

Next, a case that marking is not executed at a time of recording the hidden data in the optical disc that is in a state of no further writing with a finalizing process is explained. FIG. 9 is a flow chart for explaining another operation to reproduce hidden data with the optical disc recording/ reproducing apparatus. The optical disc is set in the optical disc recording/reproducing apparatus 1, and writing software is booted from the operating unit 34 by the user. Then the system controlling unit 33 transmits a signal to instruct to confirm a recording state of the optical to the controlling unit 16 (Step s16) upon the input of the instruction for the reproduction of the hidden data. The controlling unit 16 received this signal transmits the signal via the servo circuit in order to move the optical pickup 10, and detects the TOC information of data recorded in accordance with the standard (Step s62).

The controlling unit 16 obtains information of the last position of data recorded in accordance with the standard from the detected TOC information (Step s63). Then the controlling unit 16 moves the optical pickup to the last position of data and confirms whether there is a lead in area after in the last position of data (Step s64). If there is the lead in area, the hidden data is recorded with session format. Therefore, information of each recorded data is obtained (Step s65) from the TOC information read from the lead in area, and the hidden data is reproduced (Step s66) according to an instruction of the user.

On the other hand, since the hidden data is recorded with the format only with the program area in the case that there is no lead in area at Step s64, the whole area after the last position of data recorded in accordance with the standard is scanned, information of each recorded data is obtained to reserve in the RAM (Step s67). Also, when the information of each recorded data is recorded in a starting point of the program area, the starting point of the program area may be read. Then the hidden data is reproduced (Step s66) according to an instruction of the user.

The above-described process that the optical disc recording/reproducing apparatus executes may be executed by the optical disc recording/reproducing apparatus by reading the program (software) recorded in the optical disc or the like. This program may preferably be recoded in the optical disc in order to be reproduced with the optical disc recording/reproducing apparatus or the optical disc reproducing apparatus. Also, a communication line may be connected to the optical disc recording/reproducing apparatus, the optical disc recording apparatus or the optical disc reproducing apparatus, or be transmitted by a wireless communication in order to read the program. By reading the program in the optical recording/reproducing apparatus, the present invention can be realized with the conventional apparatuses. Therefore, since the user does not need to newly purchase the optical recording/reproducing apparatus according to the present invention, the burden imposed on the user will be lightened.

As described before, data can be recorded in the optical disc that is in a state of no further writing with a finalizing process according to the present invention. Also, only a user who has the optical disc reproducing apparatus of the present invention can use the present invention. Therefore, the hidden data recoded by the optical disc recording apparatus according to the present invention can be exchanged only with users having the optical disc recording apparatuses according to the present invention.

Further, in the above explanation, although the example of the optical disc recording/reproducing apparatus is explained, the present invention is not limited to that. The method of the optical disc recording is the optical disc recording apparatus that equips a data recording function of the optical disc recording/reproducing apparatus 1. Also, the method of the optical disc reproducing can be executed with the optical disc that equips a data reproducing function of the optical disc recording/reproducing apparatus 1.

Also, the present invention is not limited to the CLV method and the CAV method and can be applied to a partial CAV method and other recording methods.

The present invention has been described in connection with the preferred embodiments. The invention is not limited only to the above embodiments. It is apparent that various modifications, improvements, combinations, and the like can be made by those skilled in the art.

What is claimed is:

1. An optical disc recording method, comprising the steps of:
   (a) detecting last position information of previously recorded data and capacity information of initial data recordable capacity of an optical disc finalized in a not-additionally writable state;
   (b) calculating data recordable capacity of an unused space in accordance with the last position information of previously recorded data and the capacity information of the optical disc; and
   (c) recording data in the unused space after the last position information of the previously recorded data.

2. The optical disc recording method according to claim 1, wherein the recording step (c) records the date in the unused space with a session format comprising a first lead-in area, a first program area and a first lead-out area.

3. The optical disc recording method according to claim 2, wherein the recording step (c) records the data in the unused space with a program area of the session format comprising a second lead-in area, a second program area, and a second lead-out area.

4. The optical disc recording method according to claim 1, further comprising, between the steps (b) and (c), a step of forming a blank area formed of an unrecorded track between a first area of the previously recorded data and a second area of the data recorded in the unused space.

5. The optical disc recording method according to claim 1, further comprising the step of marking, at a predetermined position of the optical disc, when the recording step (c) records a predetermined data in the unused space.

6. An optical disc recording apparatus, comprising:

a detecting device to detect last position information of previously recorded data and capacity information of initial data recordable capacity of an optical disc finalized in a not-additionally writable state;

a calculating device to calculate data recordable capacity of an unused space in accordance with the last position information of the previously recorded data and the capacity information of the optical disc;

a recording device to record data in the unused space after the last position information of previously recorded data; and a controlling device to control the detecting device, the calculating device and the recording device.

7. The optical disc recording apparatus according to claim 6, wherein the recording device records the data in the unused space with a session format comprising a first lead-in area, a first program area and a first lead out-area.

8. The optical disc recording apparatus according to claim 7, wherein the recording device records the data in the unused space with a program area of the session format comprising a second lead-in area, a second program area, and a second lead-out area.

9. The optical disc recording apparatus according to claim 6, further comprising a forming device that forms a blank area formed of an unrecorded track between a first area of the previously recorded data and a second area of the data recorded in the unused space.

10. The optical disc recording apparatus according to claim 6, further comprising a marking device to mark, at a predetermined position of the optical disc when the recording device records a predetermined data in the unused space.

11. An optical disc reproducing apparatus, comprising:

a detecting device to detect a marking, at a predetermined position of an optical disc, finalized in a not-additionally writable state;

a scanning device to scan an area after a last position of previously recorded data when the detecting device detects the marking; and a reading device that reads data recorded in the scanned area after the last position of the previously recorded data.

12. An optical disc reproducing apparatus, comprising:

a scanning device to scan an area after a last position of previously recorded data; and a reading device to read data recorded in the scanned area after the last position of the previously recorded data.

13. An optical disc recording apparatus, comprising:

detecting means for detecting last position information of previously recorded data and capacity information of initial data recordable capacity of an optical disc finalized in a not-additionally writable state;

calculating means for calculating data recordable capacity of an unused space in accordance with the last position information of previously recorded data and the capacity information of the optical disc; and recording means for recording data in the unused space after the last position information of the previously recorded data.

14. The optical disc recording apparatus according to claim 13, wherein the recording means records the data in the unused space with a session format comprising a first lead-in area, a first program area, and a first lead-out area.

15. An optical disc recording apparatus according to claim 14, wherein the recording means records the data in the unused space with a program area of the session format comprising a second lead-in area, a second program area, and a second lead-out area.

16. An optical disc recording apparatus according to claim 13, further comprising a forming means for forming a blank area formed of an unrecorded track between a first area of the previously recorded data and a second area of the data recorded in the unused space.

17. An optical disc recording apparatus according to claim 13, further comprising a marking means for marking, at a predetermined position of the optical disc, when the recording means records a predetermined data in the unused space.

* * * * *